(12) United States Patent
Diephuis et al.

(10) Patent No.: US 11,926,198 B2
(45) Date of Patent: Mar. 12, 2024

(54) SIDE DOOR FOR A VEHICLE (71) Applicant: Ford Global Technologies, LLC, Dearborn, MI (US)

(72) Inventors: Jesse Rene Diephuis, West Bloomfield, MI (US); Michael John Harmon, Westland, MI (US); Andrew Brand, Bloomfield Township, MI (US); Ryan Wayne Warner, Ann Arbor, MI (US); Andrew Smith, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/501,222

(22) Filed: Oct. 14, 2021

(65) Prior Publication Data

US 2023/0121910 A1   Apr. 20, 2023

(51) Int. Cl.
*B60J 5/04* (2006.01)
*B60J 7/16* (2006.01)

(52) U.S. Cl.
CPC ........... *B60J 5/0473* (2013.01); *B60J 5/0468* (2013.01); *B60J 5/0469* (2013.01); *B60J 5/0477* (2013.01); *B60J 7/1642* (2013.01)

(58) Field of Classification Search
CPC ...... B60J 5/0473; B60J 5/0468; B60J 5/0477; B60J 7/1642
USPC .................................................... 296/146.12
See application file for complete search history.

(56) References Cited

U.S. PATENT DOCUMENTS

| 5,242,208 | A | * | 9/1993 | Ohya | ........................ B60J 1/14 296/146.1 |
| 5,577,793 | A | | 11/1996 | Kobasic | |
| 6,142,555 | A | * | 11/2000 | Huber | ................... B60J 7/1692 296/107.17 |
| 6,250,707 | B1 | * | 6/2001 | Dintner | ................... B60J 7/205 49/248 |

(Continued)

FOREIGN PATENT DOCUMENTS

| DE | 10017712 | * | 8/2001 |
| DE | 102021127492 A1 | * | 4/2022 |

(Continued)

OTHER PUBLICATIONS

DE 10017712 machine translation; (Year: 2001).*

*Primary Examiner* — Amy R Weisberg
*Assistant Examiner* — Melissa Ann Bonifazi
(74) *Attorney, Agent, or Firm* — Vichit Chea; Price Heneveld LLP (57) ABSTRACT

A vehicle includes a support structure. The vehicle also includes a side door operable to move relative to the support structure between an open position and a closed position. In the open position of the side door, access to a vehicle interior of the vehicle is provided. In the closed position of the side door, the side door extends across a longitudinal centerline of the vehicle. The vehicle further includes a plurality of pivot members, each pivotably coupled to the support structure at a first end and pivotably coupled to the side door at a second end. The side door is movable between the open and closed positions via pivotal movement of each of the plurality of pivot members relative to the support structure and pivotal movement of the side door relative to each of the plurality of pivot members.

18 Claims, 6 Drawing Sheets

(56) References Cited

U.S. PATENT DOCUMENTS

| | | | |
|---|---|---|---|
| 7,322,636 B1* | 1/2008 | Woodhouse | B60J 5/0477 |
| | | | 296/147 |
| 7,488,029 B2 | 2/2009 | Lechkun et al. | |
| 7,950,719 B2 | 5/2011 | Elliott et al. | |
| 8,132,843 B2 | 3/2012 | Schmitt | |
| 9,045,025 B1 | 6/2015 | Greene et al. | |
| 2008/0296925 A1* | 12/2008 | Fallis, III | B60J 7/145 |
| | | | 296/108 |
| 2012/0212006 A1* | 8/2012 | Coldre | B60J 5/0473 |
| | | | 296/146.4 |
| 2018/0283072 A1 | 10/2018 | Laurent et al. | |
| 2019/0061489 A1* | 2/2019 | Hoggarth | B60J 5/06 |
| 2020/0346574 A1* | 11/2020 | Cha | B60R 16/03 |
| 2021/0122278 A1* | 4/2021 | Hsu | B60N 2/14 |
| 2021/0291632 A1* | 9/2021 | Ding | B60J 5/0477 |
| 2022/0205301 A1* | 6/2022 | Cho | B60J 5/047 |

FOREIGN PATENT DOCUMENTS

| | | | | |
|---|---|---|---|---|
| EP | 2471678 B1 | | 6/2017 | |
| FR | 2852912 A1 * | 10/2004 | | B60J 5/02 |
| JP | H0971133 A * | 3/1997 | | |

\* cited by examiner

SIDE DOOR FOR A VEHICLE

FIELD OF THE DISCLOSURE

The present disclosure generally relates to a door for a vehicle. More specifically, the present disclosure relates to a side door for a vehicle.

BACKGROUND OF THE DISCLOSURE

Vehicles typically include doors.

SUMMARY OF THE DISCLOSURE

According to a first aspect of the present disclosure, a vehicle includes a support structure. The vehicle also includes a side door operable to move relative to the support structure between an open position and a closed position. In the open position of the side door, access to a vehicle interior of the vehicle is provided. In the closed position of the side door, the side door extends across a longitudinal centerline of the vehicle. The vehicle further includes a plurality of pivot members, each pivotably coupled to the support structure at a first end and pivotably coupled to the side door at a second end. The side door is movable between the open and closed positions via pivotal movement of each of the plurality of pivot members relative to the support structure and pivotal movement of the side door relative to each of the plurality of pivot members.

Embodiments of the first aspect of the present disclosure can include any one or a combination of the following features:
- the side door extends across the longitudinal centerline of the vehicle in the open position;
- a rear door positioned vehicle-rearward of the side door;
- the plurality of pivot members includes a first pivot member, a second pivot member, a third pivot member, and a fourth pivot member;
- the first pivot member is vehicle-rearward of the second pivot member, the second pivot member is vehicle-rearward of the third pivot member, and the third pivot member is vehicle-rearward of the fourth pivot member;
- the first end of the first pivot member is a first distance from the second end of the first pivot member, the first end of the second pivot member is a second distance from the second end of the second pivot member, the first end of the third pivot member is a third distance from the second end of the third pivot member, and the first end of the fourth pivot member is a fourth distance from the second end of the fourth pivot member, and wherein the first distance is greater than the second distance and less than the fourth distance, and the second distance is less than the first, third, and fourth distances;
- the first end of at least one of the plurality of pivot members is positioned above the support structure and beneath the side door in the closed position of the side door;
- at least one of the plurality of pivot members extends across the longitudinal centerline of the vehicle in the closed position of the side door; and
- a side panel pivotably coupled to a body of the vehicle and operable to pivot between a first position, wherein, in the closed position of the side door, the side panel is coupled with the side door and cooperates with the side door to cover an opening to the vehicle, and a second position, wherein the side panel is positioned vehicle-downward and vehicle-laterally outboard of a floor of the vehicle.

According to a second aspect of the present disclosure, a vehicle includes a first lateral side, a second lateral side opposite the first lateral side, a roof extending between the first and second lateral sides, and a side door having a side portion and a roof portion coupled to the side portion at a corner. The side door is operable between a closed position and an open position. In the closed position of the side door, the side door covers an opening defined by the first lateral side and the roof. In the open position of the side door, at least a portion of the side portion of the side door extends above the roof and at least a portion of the roof portion of the side door extends alongside the second lateral side of the vehicle.

Embodiments of the second aspect of the present disclosure can include any one or a combination of the following features:
- a driver door coupled to the second lateral side and operable to move between driver door open and closed positions in the open position of the side door;
- a plurality of pivot members, each pivotably coupled to a support structure of the vehicle at a first end and pivotably coupled to the side door at a second end, wherein the side door is movable between the open and closed positions via pivotal movement of each of the plurality of pivot members relative to the support structure and pivotal movement of the side door relative to each of the plurality of pivot members;
- at least one of the plurality of pivot members is pivotably coupled to the roof portion of the side door;
- each of the plurality of pivot members is pivotably coupled to the roof portion of the side door;
- the plurality of pivot members includes a first pivot member, a second pivot member, a third pivot member, and a fourth pivot member, wherein the first pivot member is vehicle-rearward of the second pivot member, the second pivot member is vehicle-rearward of the third pivot member, and the third pivot member is vehicle-rearward of the fourth pivot member; and
- a side panel pivotably coupled to a body of the vehicle and operable to pivot between a first position, wherein, in the closed position of the side door, the side panel is coupled with the side door and cooperates with the side door to cover the opening, and a second position, wherein the side panel is positioned vehicle-downward and vehicle-laterally outboard of a floor of the vehicle.

According to a third aspect of the present disclosure, a vehicle includes a first lateral side, a second lateral side opposite the first lateral side, a roof extending between the first and second lateral sides, and a side door operable between a closed position and an open position. In the closed position of the side door, the side door covers an opening defined by the roof and the first lateral side. In the open position of the side door, a portion of the side door is wholly vehicle-downward of the roof and vehicle-laterally-outboard of the second lateral side.

Embodiments of the third aspect of the present disclosure can include any one or a combination of the following features:
- a plurality of pivot members that operably couple the side door to a support structure of the vehicle, each of the plurality of pivot members having a first end that is pivotably coupled to the support structure and a second end that is pivotably coupled to the side door, wherein the side door is movable between the open and closed positions via pivotal movement of each of the plurality of pivot members relative to the support structure and pivotal movement of the side door relative to each of the plurality of pivot members;

the side door extends across a longitudinal centerline of the vehicle in the closed position of the side door; and a side panel pivotably coupled to a body of the vehicle and operable to pivot between a first position, wherein, in the closed position of the side door, the side panel is coupled with the side door and cooperates with the side door to cover the opening, and a second position, wherein the side panel is positioned vehicle-downward and vehicle-laterally outboard of a floor of the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-6, a vehicle 10 includes a support structure 60. A side door 34 is operable to move relative to the support structure 60 between an open position, wherein access to a vehicle interior 20 of the vehicle 10 is provided, and a closed position, wherein the side door 34 extends across a longitudinal centerline 52 of the vehicle 10. The vehicle 10 includes a plurality of pivot members 64. Each of the plurality of pivot members 64 is pivotably coupled to the support structure 60 at a first end 66 and pivotably coupled to the side door 34 at a second end 68. The side door 34 is movable between the open and closed positions via pivotal movement of each of the plurality of pivot members 64 relative to the support structure 60 and pivotal movement of the side door 34 relative to each of the plurality of pivot members 64.

Figure 1:
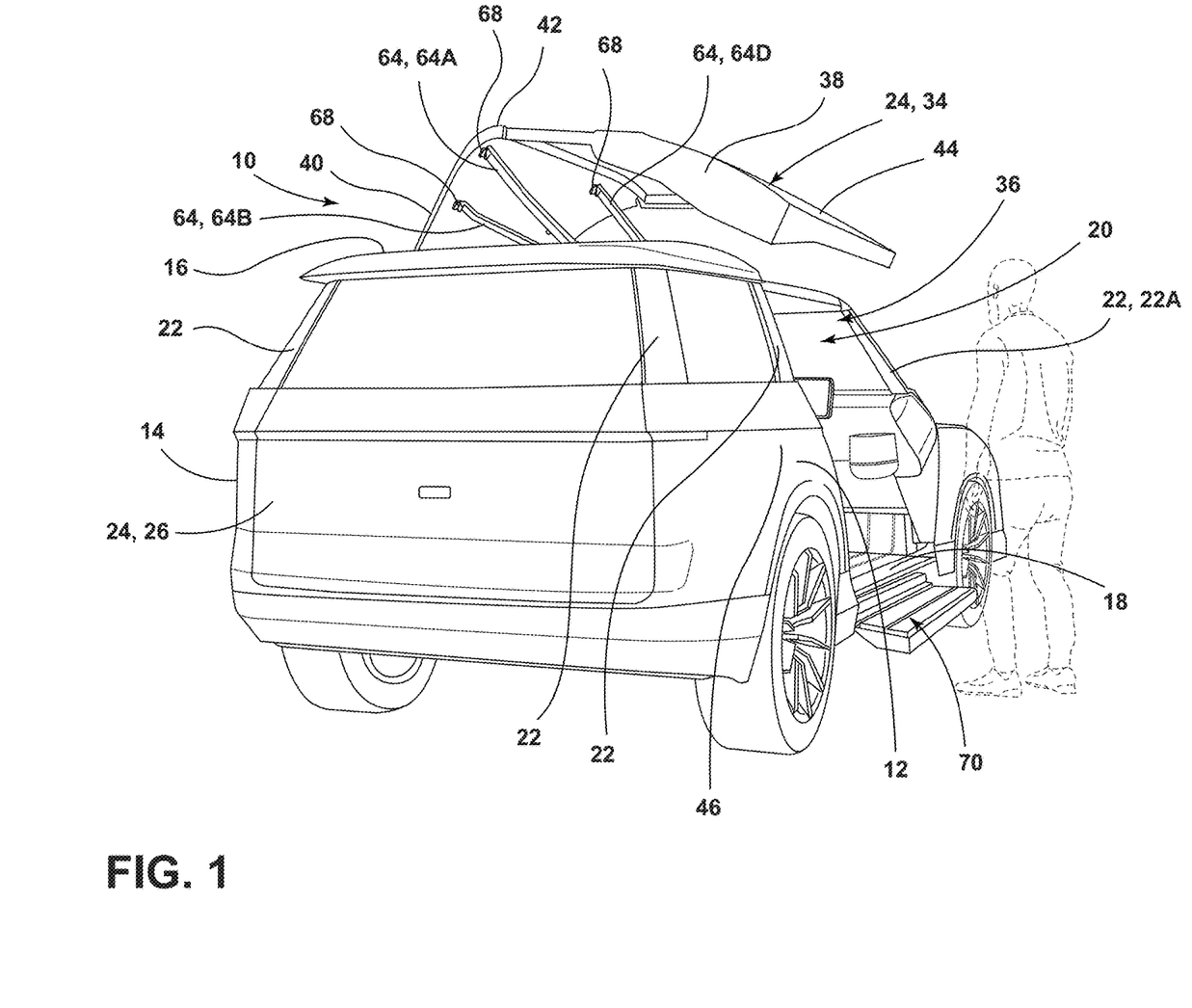
FIG. 1 is a rear perspective view of a vehicle, illustrating a side door of the vehicle in an open position and a side panel of the vehicle in a second position, according to one embodiment.
Figure 2:
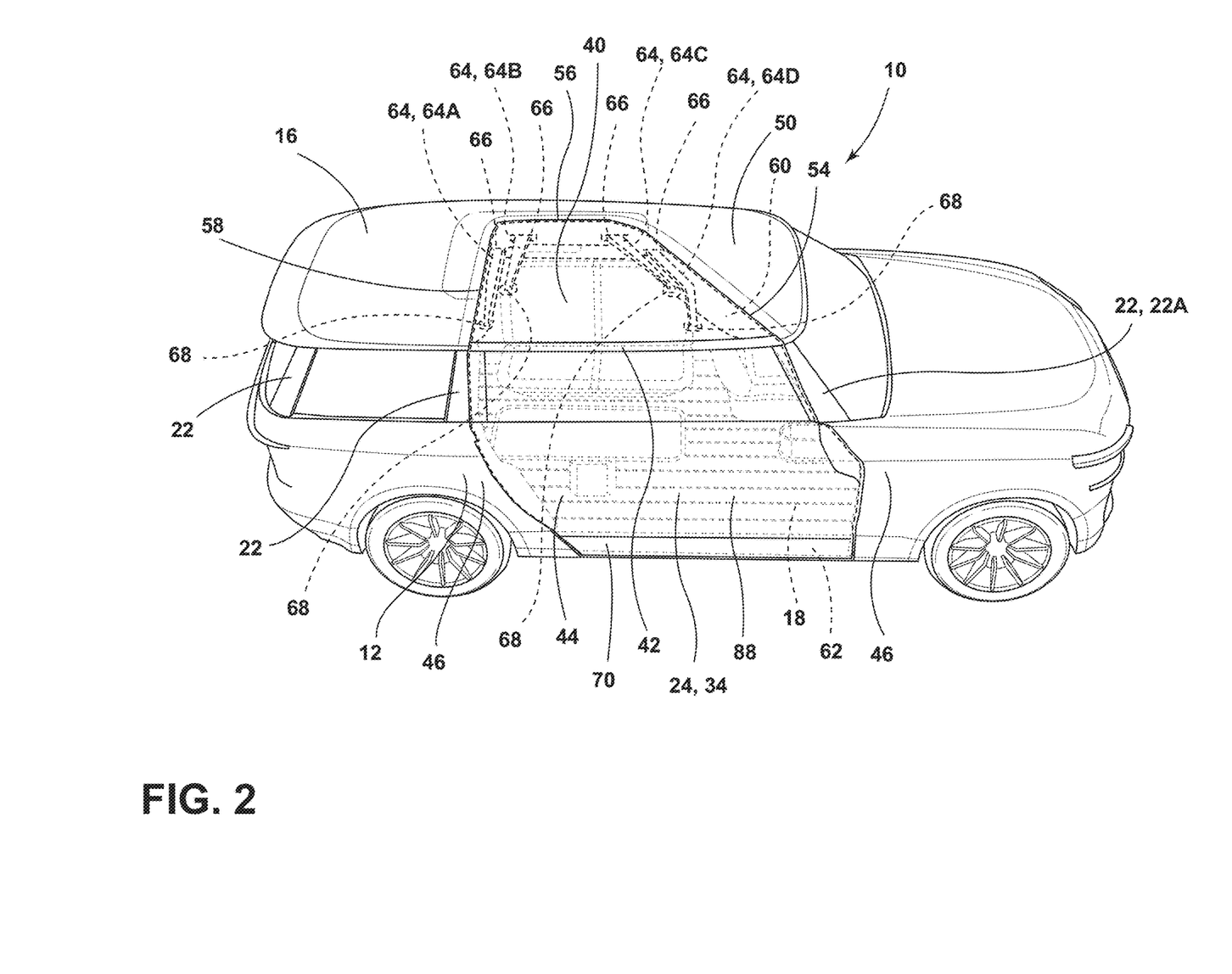
FIG. 2 is a top perspective view of the vehicle, illustrating the side door in a closed position, and the side panel in a first position, according to one embodiment.
Figure 3:
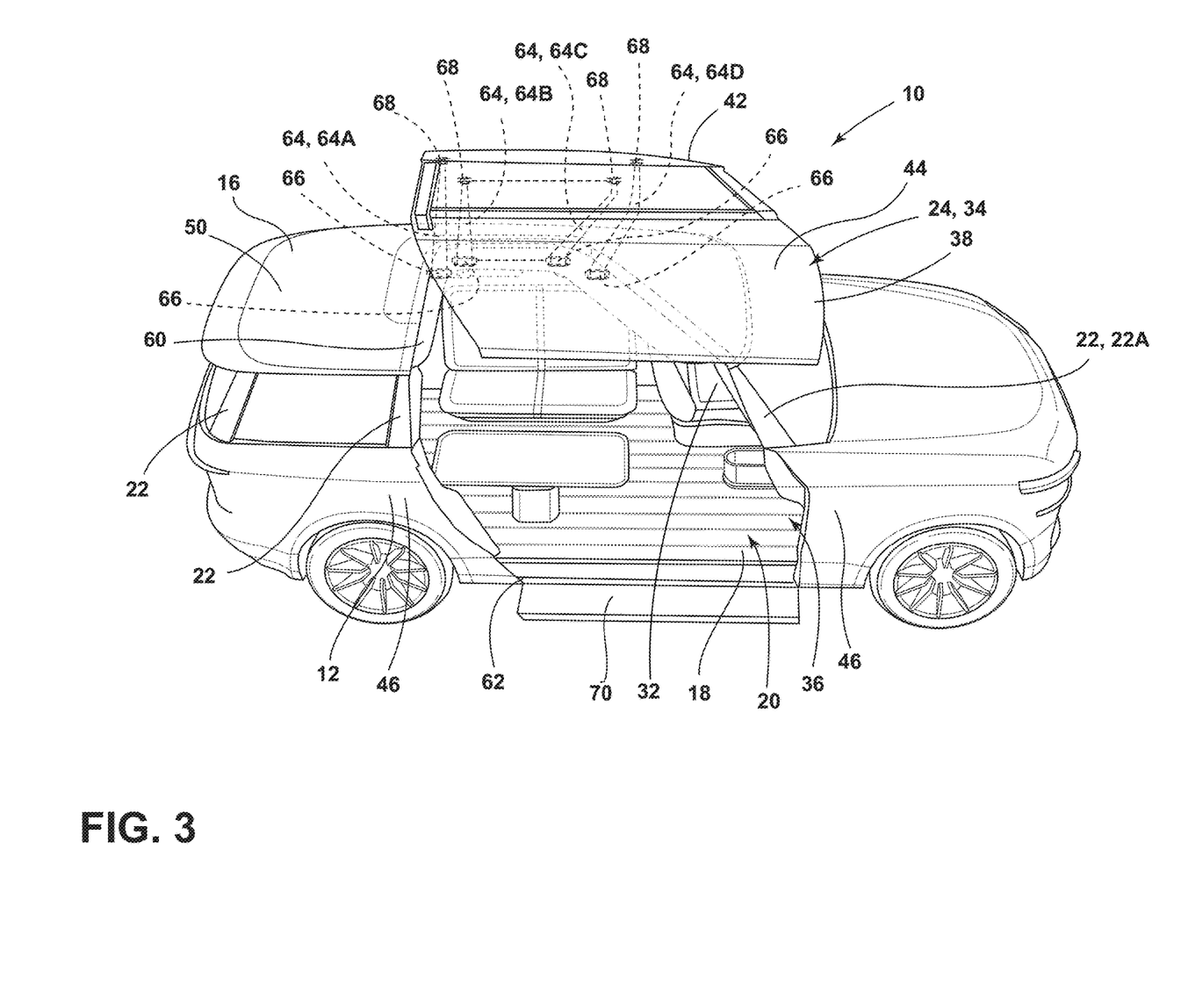
FIG. 3 is a top perspective view of the vehicle, illustrating the side door in the open position, and the side panel in the second position, according to one embodiment.
Figure 4:
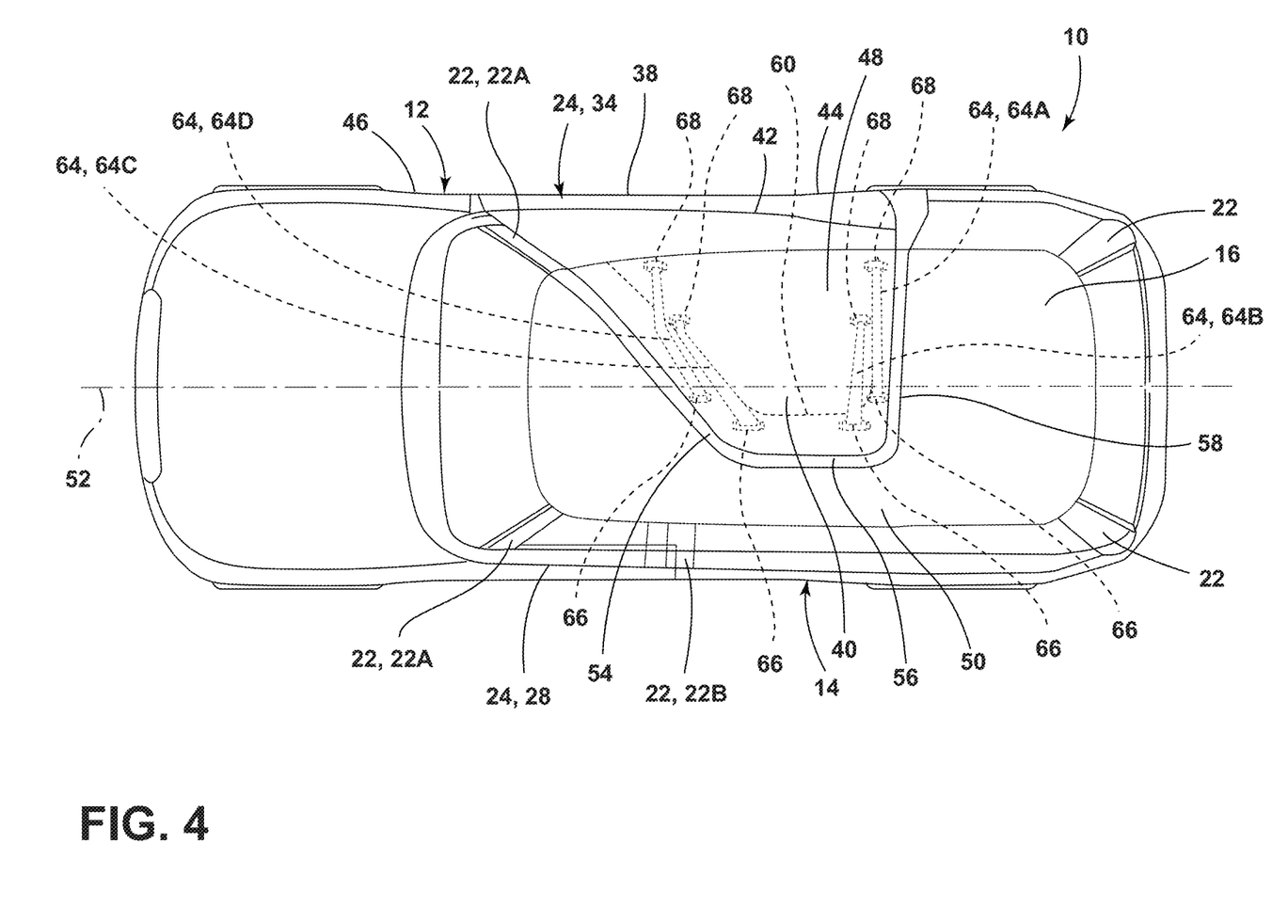
FIG. 4 is a plan view of the vehicle, illustrating the side door of the vehicle in the closed position and a driver door of the vehicle in a driver door closed position, according to one embodiment.
Figure 5:
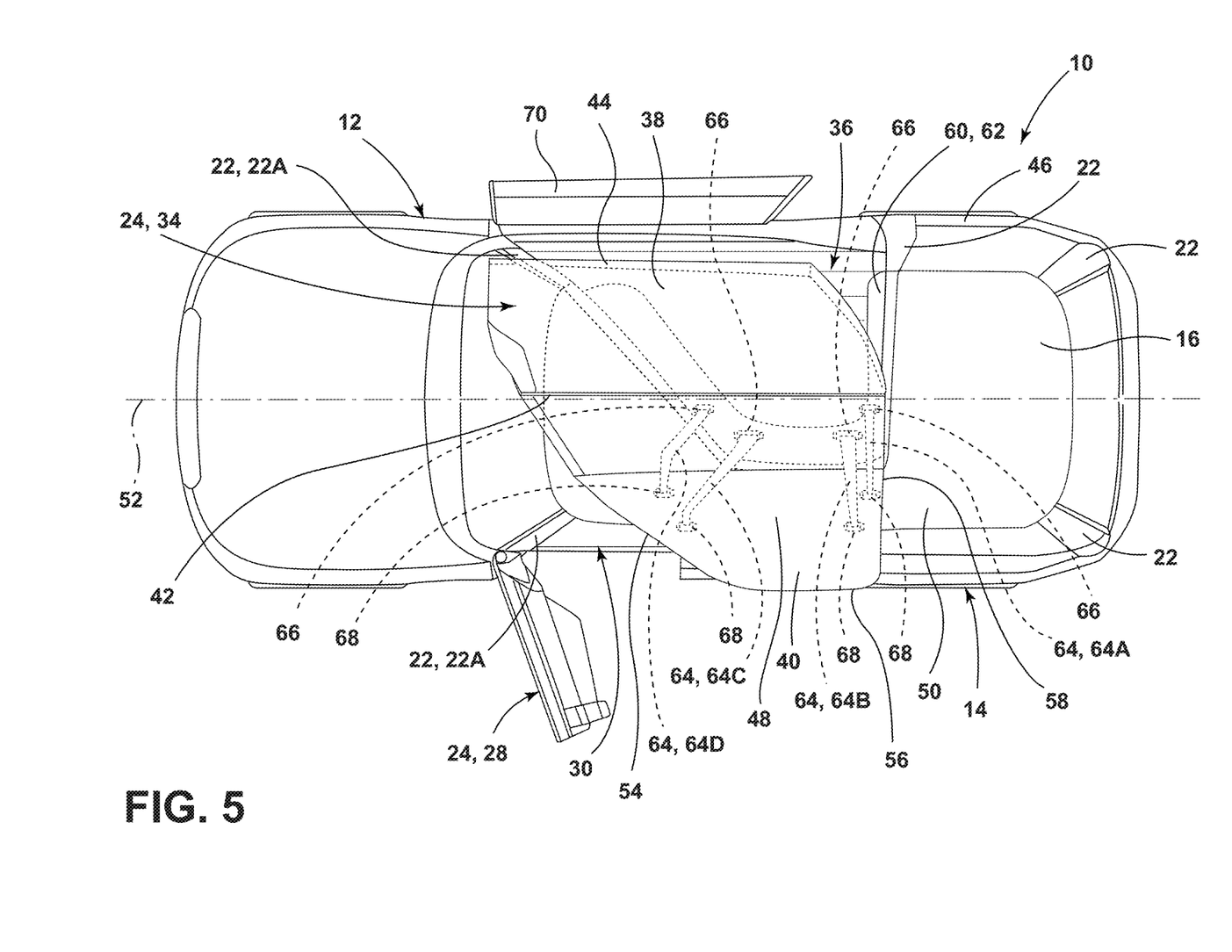
FIG. 5 is a plan view of the vehicle, illustrating the side door in the open position, the side panel in the second position, and the driver door in a driver door open position, according to one embodiment.
Figure 6:
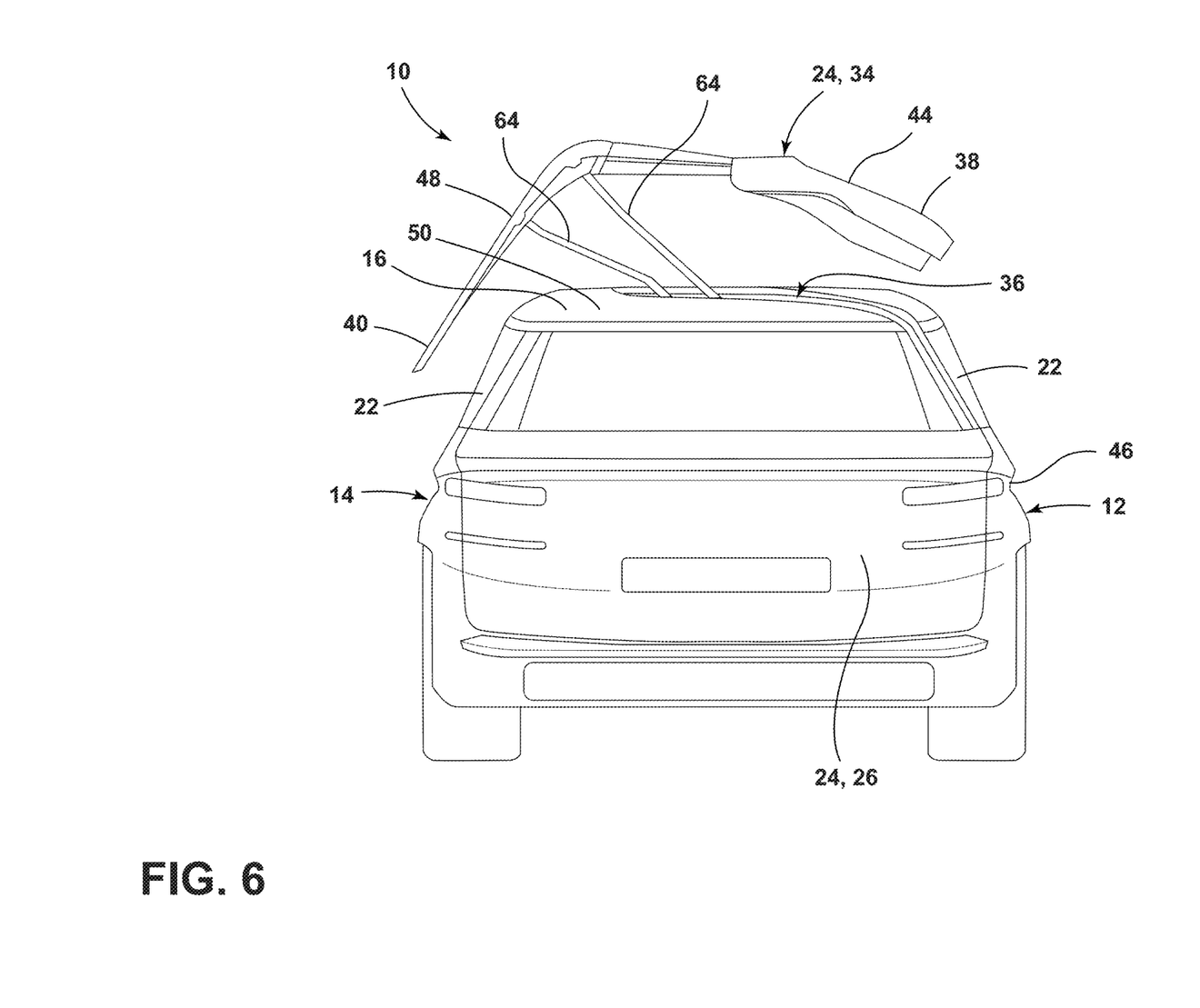
FIG. 6 is a rear elevational view of the vehicle, illustrating the side door in the open position, according to one embodiment.

Referring still to FIGS. 1-6, the vehicle 10 includes a first lateral side 12, a second lateral side 14 opposite the first lateral side 12, and a roof 16 that extends between the first and second lateral sides 12, 14. The vehicle 10 further includes a floor 18 that is positioned vehicle-downward of the roof 16 and laterally between the first and second lateral sides 12, 14 of the vehicle 10. The vehicle 10 may include a vehicle interior 20. The vehicle interior 20 may be vehicle-downward of the roof 16, vehicle-upward of the floor 18, and/or laterally between the first and second lateral sides 12, 14 of the vehicle 10. As illustrated in FIGS. 2 and 3, a plurality of pillars 22 of the vehicle 10 (e.g., A pillar 22A, B pillar 22B, etc.) may extend vehicle-downward from the roof 16 of the vehicle 10. The first and second lateral sides 12, 14 of the vehicle 10 may include one or more of the pillars 22. In the embodiment illustrated in FIGS. 1-6, the first lateral side 12 of the vehicle 10 is the right side of the vehicle 10 (from a vehicle-forward-facing perspective, as illustrated in FIG. 6), and the second lateral side 14 of the vehicle 10 is the left side of the vehicle 10 (from a vehicle-forward-facing perspective). It is contemplated that, in various embodiments, the first lateral side 12 of the vehicle 10 may be the left side of the vehicle 10 from a vehicle-forward-facing perspective, and the second lateral side 14 of the vehicle 10 may be the right side of the vehicle 10 from a vehicle-forward-facing perspective.

As illustrated in FIGS. 1-6, the vehicle 10 includes a door 24. In various embodiments, the vehicle 10 may include a plurality of doors 24. As illustrated in FIG. 1, in some embodiments, the vehicle 10 may include a rear door 26. Further, as illustrated in FIGS. 4 and 5, in some embodiments, the vehicle 10 may include a driver door 28. The driver door 28 may be operable between a driver door closed position, as illustrated in FIG. 4, and a driver door open position, as illustrated FIG. 5. In the driver door open position, a driver door opening 30 is revealed. The driver door opening 30 is adjacent to a driver seating assembly 32 of the vehicle 10. In the embodiment illustrated in FIGS. 4 and 5, the driver door 28 is positioned at the second lateral side 14 of the vehicle 10, and the driver door 28 is substantially flush with the second lateral side 14 of the vehicle 10 in the driver door closed position, as illustrated in FIG. 4. In various embodiments, the vehicle 10 includes the side door 34. The side door 34 may be operable between an open position and a closed position. In the closed position, the side door 34 of the vehicle 10 may cover an opening 36 of the vehicle 10 that provides access to the vehicle interior 20. In various embodiments, the opening 36 may be defined by the first lateral side 12 of the vehicle 10 and the roof 16 of the vehicle 10. For example, as illustrated in FIGS. 2 and 3, the opening 36 is adjacent to the A pillar 22A on the first lateral side 12 of the vehicle 10 and is defined by both the first lateral side 12 of the vehicle 10 and the roof 16 of the vehicle 10. In the open position of the side door 34, access to the vehicle interior 20 may be provided via the opening 36. As illustrated in FIG. 1, the rear door 26 may be positioned vehicle-rearward of the side door 34.

In various embodiments, the side door 34 of the vehicle 10 may include a side portion 38 and a roof portion 40. The side portion 38 may be coupled to the roof portion 40 at a corner 42. In the closed position of the side door 34, the roof portion 40 of the side door 34 may cover the portion of the opening 36 that is defined by the roof 16 of the vehicle 10, and the side portion 38 of the side door 34 may cover the portion of the opening 36 that is defined by the first lateral side 12 of the vehicle 10. As illustrated in FIG. 2, in the closed position of the side door 34, an exterior surface 44 of the side portion 38 of the side door 34 is substantially flush with an adjacent exterior surface 46 of the first lateral side 12 of the vehicle 10. Further, an exterior surface 48 of the roof portion 40 of the side door 34 is substantially flush with an exterior surface 50 of the roof 16 of the vehicle 10 adjacent to the side door 34. In various embodiments, surfaces may be flush with each other when the surfaces are coplanar with each other. It is contemplated that nonplanar surfaces, such as curved surfaces, may be flush with each other in addition to coplanar surfaces being flush with each other. For example, two curved surfaces that are aligned with each other at adjacent edges may be flush with each other.

In some embodiments, the side door 34 may extend across a longitudinal centerline 52 of the vehicle 10 in the closed position. For example, as illustrated in FIG. 4, the roof portion 40 of the side door 34 extends vehicle-laterally toward the second lateral side 14 of the vehicle 10 from the corner 42 of the side door 34 and terminates between the second lateral side 14 of the vehicle 10 and the longitudinal centerline 52 of the vehicle 10. As illustrated, a first portion of the roof portion 40 of the vehicle 10 is positioned between the first lateral side 12 of the vehicle 10 and the longitudinal centerline 52 of the vehicle 10, and a second portion of the roof portion 40 of the side door 34 is positioned between the longitudinal centerline 52 of the vehicle 10 and the second lateral side 14 of the vehicle 10.

Referring now to FIGS. 1, 3, 5, and 6, in some embodiments, in the open position of the side door 34, at least a portion of the side portion 38 of the side door 34 may extend above the roof 16 of the vehicle 10, and at least a portion of the roof portion 40 of the side door 34 may extend alongside the second lateral side 14 of the vehicle 10. For example, as illustrated in FIG. 6, wherein the side door 34 is illustrated in the open position, the side portion 38 of the side door 34 extends above (i.e., directly vehicle-upward of) the roof 16 of the vehicle 10, and a portion of the roof portion 40 of the side door 34 extends alongside the second lateral side 14 of the vehicle 10. In the embodiment illustrated in FIG. 6, a portion of the side door 34 is wholly vehicle-downward of the roof 16 and vehicle-laterally-outboard of the second lateral side 14. In other words, the roof 16 is at a higher vehicle-elevation than the portion of the side door 34, and the portion of the side door 34 is positioned such that the second lateral side 14 is disposed between the portion of the side door 34 and the longitudinal centerline 52 of the vehicle 10.

As illustrated in FIG. 5, in various embodiments, the side door 34 may extend across the longitudinal centerline 52 of the vehicle 10 in the open position. The portion of the side door 34 that is positioned between the longitudinal centerline 52 of the vehicle 10 and the second lateral side 14 of the vehicle 10 in the open position of the side door 34 may be larger than the portion of the side door 34 that is disposed between the longitudinal centerline 52 of the vehicle 10 and the second lateral side 14 of the vehicle 10 in the closed position of the side door 34.

In some embodiments, the driver door 28 may be operable between the driver door open and closed positions while the side door 34 is in the open position, as illustrated in FIG. 5. In some implementations, the shape of the side door 34 may enable the driver door 28 to move between the driver door open and closed positions in the open position of the side door 34. For example, as illustrated in FIG. 4, a vehicle-forward-most edge 54 of the roof portion 40 of the side door 34 may extend vehicle-laterally and vehicle-rearward from the corner 42 of the side door 34 to a distal edge 56 of the roof portion 40 of the side door 34 relative to the corner 42 of the side door 34. The distal edge 56 of the roof portion 40 of the side door 34 extends vehicle-rearward from the vehicle-forward-most edge 54 of the roof portion 40 of the side door 34 to a vehicle-rearward-most edge 58 of the roof portion 40 of the side door 34, which extends vehicle-laterally back to the corner 42 of the side door 34. As illustrated in FIG. 5, the angled vehicle-forward-most edge 54 of the roof portion 40 of the side door 34 provides clearance for the driver door 28 to move between the driver door open and closed positions, despite the vehicle-forward-most edge 54 of the roof portion 40 of the side door 34 initiating at the corner 42 of the side door 34 adjacent to the A pillar 22A of the vehicle 10.

Referring now to FIGS. 2-5, the vehicle 10 may include a support structure 60. The support structure 60 may be a portion of a body 62 of the vehicle 10. In various embodiments, the support structure 60 may be coupled to the roof 16 of the vehicle 10. In some embodiments, the support structure 60 may extend into the portion of the opening 36 defined by the roof 16, as illustrated in FIGS. 2-5. In various embodiments, the door 24 may move relative to the support structure 60 between the open and closed positions.

Referring still to FIGS. 2-5, in some embodiments, the door 24 may be coupled to the support structure 60 by a plurality of pivot members 64. Each of the plurality of pivot members 64 includes a first end 66 and a second end 68 that is distal from the first end 66. Each pivot member 64 may be pivotably coupled to the support structure 60 at the first end 66 and pivotably coupled to the side door 34 at the second end 68. In various embodiments, the side door 34 may be movable between the open and closed positions via pivotal movement of each of the plurality of pivot members 64 relative to the support structure 60 and pivotal movement of the side door 34 relative to each of the plurality of pivot members 64. The second end 68 of each of the pivot members 64 may be coupled to the side door 34 at a variety of positions on the side door 34. In some embodiments, the second end 68 of at least one of the pivot members 64 may be coupled to the roof portion 40 of the side door 34. In some implementations, each of the plurality of pivot members 64 may be coupled to the roof portion 40 of the side door 34 at the second end 68 of the pivot member 64.

In the embodiment illustrated in FIGS. 2-5, the plurality of pivot members 64 includes a first pivot member 64A, a second pivot member 64B, a third pivot member 64C, and a fourth pivot member 64D. In the illustrated embodiment, the first pivot member 64A is positioned vehicle-rearward of the second pivot member 64B, the second pivot member 64B is vehicle-rearward of the third pivot member 64C, and the third pivot member 64C is vehicle-rearward of the fourth pivot member 64D. The first, second, third, and/or fourth pivot members 64A, 64B, 64C, 64D may be positioned in a variety of vehicle-directions relative to each other, in various implementations. The plurality of pivot members 64 may have a variety of shapes and sizes. In some embodiments, one or more of the plurality of pivot members 64 may be a different length relative to one or more other pivot members 64 of the plurality of pivot members 64. In the embodiment illustrated in FIG. 2, the first end 66 of the first pivot member 64A is a first distance from the second end 68 of the first pivot member 64A, the first end 66 of the second pivot member 64B is a second distance from the second end 68 of the second pivot member 64B, the first end 66 of the third pivot member 64C is a third distance from the second end 68 of the third pivot member 64C, and the first end 66 of the fourth pivot member 64D is a fourth distance from the second end 68 of the fourth pivot member 64D. The first distance is greater than the second distance and less than the fourth distance, and the second distance is less than the first, third, and fourth distances.

Referring still to FIGS. 2-5, in some embodiments, at least one of the plurality of pivot members 64 may be coupled to the support structure 60 and the side door 34, such that the first end 66 of the at least one pivot member 64 is positioned above (i.e., directly vehicle-upward of) the support structure 60 and beneath (i.e., directly vehicle-downward of) the side door 34 in the closed position of the side door 34. In some implementations, the first ends 66 of more than one of the pivot members 64 may be positioned above the support structure 60 and beneath the side door 34 in the closed position of the side door 34. For example, as illustrated in FIGS. 2 and 4, the first end 66 of each of the plurality of pivot members 64 is above the support structure 60 and beneath the side door 34 in the closed position of the side door 34. In some embodiments, at least one of the plurality of pivot members 64 may extend across the longitudinal centerline 52 of the vehicle 10 in the closed position of the side door 34. For example, as illustrated in FIG. 4, wherein the side door 34 is in the closed position, the first end 66 of each of the plurality of pivot members 64 is coupled to the support structure 60 at a position that is between the longitudinal centerline 52 of the vehicle 10 and the second lateral side 14 of the vehicle 10; each of the pivot members 64 extends from its first end 66 to its second end 68; the second end 68 of each of the pivot members 64 is positioned between the longitudinal centerline 52 of the vehicle 10 and the first lateral side 12 of the vehicle 10. Thus, each of the plurality of pivot members 64 extends across the longitudinal centerline 52 of the vehicle 10 in the closed position of the side door 34. It is contemplated that one or more of the pivot members 64 may not extend across the longitudinal centerline 52 of the vehicle 10 in the closed position of the side door 34, in some embodiments.

Referring now to FIGS. 1-5, the vehicle 10 may include a side panel 70. The side panel 70 may be coupled to the body 62 of the vehicle 10. In various implementations, the side panel 70 may be pivotably coupled to the body 62 of the vehicle 10 and operable to pivot between first and second positions. As illustrated in FIG. 2, in a condition of the vehicle 10 wherein the side panel 70 is in the first position and the side door 34 is in the closed position, the side panel 70 may be coupled with the side door 34 and may cooperate with the side door 34 to cover the opening 36 to the vehicle 10. As illustrated in FIGS. 1 and 3, in a condition of the vehicle 10 wherein the side panel 70 is in the second position, the side panel 70 may be positioned vehicle-downward and vehicle-laterally-outboard of a floor 18 of the vehicle 10. As illustrated in FIG. 1, in a condition of the vehicle 10, wherein the side panel 70 is in the second position and the side door 34 is in the open position, the side panel 70 may be configured to be utilized as a running board step by a user entering or exiting the vehicle 10 via the opening 36. It is contemplated that the side panel 70 may be omitted, such that the side door 34 covers the opening 36 in the closed position, in some embodiments.

In operation of an exemplary embodiment of the vehicle 10, a first user approaches the first lateral side 12 of the vehicle 10 and opens the side door 34. The side door 34 moves from the closed position to the open position via pivotal movement of the plurality of pivot members 64 relative to the support structure 60 and pivotal movement of the door 24 relative to the plurality of pivot members 64. Next, a second user of the vehicle 10 approaches the second lateral side 14 of the vehicle 10 and opens the driver door 28 while the side door 34 is in the open position, as illustrated in FIG. 5. After the first and second users enter the vehicle 10, the driver door 28 and side door 34 are moved to the closed positions.

The vehicle 10 of the present disclosure may provide for a variety of advantages. First, the door opening via the plurality of pivot members 64 from the closed position to the open position, wherein a portion of the side door 34 is wholly vehicle-downward of the roof 16, as illustrated in FIG. 6, may result in the side door 34 extending to a maximum vertical height in the open position that is less than the maximum vertical height of a conventional gull wing-style door. This relatively shorter height may allow the door 24 to be opened within a garage or other structure that includes an overhead structure (e.g., roof). Second, the angled vehicle-forward-most edge 54 of the roof portion 40 of the side door 34 may provide clearance for the driver door 28 to move between the driver door open and closed positions, despite the vehicle-forward-most edge 54 of the roof portion 40 of the side door 34 initiating at the corner 42 of the side door 34 adjacent to the A pillar 22A of the vehicle 10. Third, one or more of the plurality of pivot members 64 being positioned above the support structure 60 in the closed position of the side door 34 may conceal at least a portion of the one or more pivot members 64 from the view of users within the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
   a support structure;
   a side door operable to move relative to the support structure between an open position, wherein access to a vehicle interior of the vehicle is provided, and a closed position, wherein the side door extends across a longitudinal centerline of the vehicle; and
   a plurality of pivot members comprising a first pivot member, a second pivot member, a third pivot member, and a fourth pivot member, each pivotably coupled to the support structure at a first end and pivotably coupled to the side door at a second end, wherein the side door is movable between the open and closed positions via pivotal movement of each of the plurality of pivot members relative to the support structure and pivotal movement of the side door relative to each of the plurality of pivot members, wherein the first pivot member is vehicle-rearward of the second pivot member, the second pivot member is vehicle-rearward of the third pivot member, and the third pivot member is vehicle-rearward of the fourth pivot member.

2. The vehicle of claim 1, wherein the side door extends across the longitudinal centerline of the vehicle in the open position.

3. The vehicle of claim 1, further comprising:
   a rear door positioned vehicle-rearward of the side door.

4. The vehicle of claim 1, wherein the first end of the first pivot member is a first distance from the second end of the first pivot member, the first end of the second pivot member is a second distance from the second end of the second pivot member, the first end of the third pivot member is a third distance from the second end of the third pivot member, and the first end of the fourth pivot member is a fourth distance from the second end of the fourth pivot member, and wherein the first distance is greater than the second distance and less than the fourth distance, and the second distance is less than the first, third, and fourth distances.

5. The vehicle of claim 1, wherein the first end of at least one of the plurality of pivot members is positioned above the support structure and beneath the side door in the closed position of the side door.

6. The vehicle of claim 1, wherein at least one of the plurality of pivot members extends across the longitudinal centerline of the vehicle in the closed position of the side door.

7. The vehicle of claim 1, further comprising:
   a side panel pivotably coupled to a body of the vehicle and operable to pivot between a first position, wherein, in the closed position of the side door, the side panel is coupled with the side door and cooperates with the side door to cover an opening to the vehicle, and a second position, wherein the side panel is positioned vehicle-downward and vehicle-laterally outboard of a floor of the vehicle.

8. A vehicle, comprising:
   a first lateral side;
   a second lateral side opposite the first lateral side;
   a roof extending between the first and second lateral sides; and
   a side door having a side portion and a roof portion coupled to the side portion at a corner, the side door being operable between a closed position, wherein the side door covers an opening defined by the first lateral side and the roof, and an open position, wherein at least a portion of the side portion of the side door extends above the roof and at least a portion of the roof portion of the side door extends wholly laterally-outboard of the second lateral side.

9. The vehicle of claim 8, further comprising:
   a driver door coupled to the second lateral side and operable to move between driver door open and closed positions in the open position of the side door.

10. The vehicle of claim 8, further comprising:
    a plurality of pivot members, each pivotably coupled to a support structure of the vehicle at a first end and pivotably coupled to the side door at a second end, wherein the side door is movable between the open and closed positions via pivotal movement of each of the plurality of pivot members relative to the support structure and pivotal movement of the side door relative to each of the plurality of pivot members.

11. The vehicle of claim 10, wherein at least one of the plurality of pivot members is pivotably coupled to the roof portion of the side door.

12. The vehicle of claim 11, wherein each of the plurality of pivot members is pivotably coupled to the roof portion of the side door.

13. The vehicle of claim 10, wherein the plurality of pivot members comprises:
    a first pivot member;
    a second pivot member;
    a third pivot member; and
    a fourth pivot member, wherein the first pivot member is vehicle-rearward of the second pivot member, the second pivot member is vehicle-rearward of the third pivot member, and the third pivot member is vehicle-rearward of the fourth pivot member.

14. The vehicle of claim 8, further comprising:
    a side panel pivotably coupled to a body of the vehicle and operable to pivot between a first position, wherein, in the closed position of the side door, the side panel is coupled with the side door and cooperates with the side door to cover the opening, and a second position, wherein the side panel is positioned vehicle-downward and vehicle-laterally outboard of a floor of the vehicle.

15. A vehicle, comprising:
    a first lateral side;
    a second lateral side opposite the first lateral side;
    a roof extending between the first and second lateral sides; and
    a side door operable between a closed position, wherein the side door covers an opening defined by the roof and the first lateral side, and an open position, wherein a portion of the side door is wholly vehicle-downward of the roof and vehicle-laterally-outboard of the second lateral side.

16. The vehicle of claim 15, further comprising:
    a plurality of pivot members that operably couple the side door to a support structure of the vehicle, each of the plurality of pivot members having a first end that is pivotably coupled to the support structure and a second end that is pivotably coupled to the side door, wherein the side door is movable between the open and closed positions via pivotal movement of each of the plurality of pivot members relative to the support structure and pivotal movement of the side door relative to each of the plurality of pivot members.

17. The vehicle of claim 15, wherein the side door extends across a longitudinal centerline of the vehicle in the closed position of the side door.

18. The vehicle of claim 15, further comprising:
a side panel pivotably coupled to a body of the vehicle and operable to pivot between a first position, wherein, in the closed position of the side door, the side panel is coupled with the side door and cooperates with the side door to cover the opening, and a second position, wherein the side panel is positioned vehicle-downward and vehicle-laterally outboard of a floor of the vehicle.

* * * * *